Dec. 13, 1927. J. H. SMITH. Re. 16,817

REAMING AND COUNTERBORING TOOL
Original Filed Sept. 20, 1920

Inventor
John Hugo Smith
By S. E. Thomas
Attorney

Reissued Dec. 13, 1927. Re. 16,817

UNITED STATES PATENT OFFICE.

JOHN HUGO SMITH, OF DETROIT, MICHIGAN, ASSIGNOR, BY MESNE ASSIGNMENTS, TO THE ECLIPSE INTERCHANGEABLE COUNTERBORE COMPANY, OF DETROIT, MICHIGAN, A CORPORATION OF MICHIGAN.

REAMING AND COUNTERBORING TOOL.

Original No. 1,418,485, dated June 6, 1922, Serial No. 411,537, filed September 20, 1920. Application for reissue filed September 10, 1927. Serial No. 218,838.

My invention relates to reaming and counter-boring tools shown in the accompanying drawings and more particularly described in the following specification and claims.

One of the objects of this invention is to construct a tool which is adapted to "spot face" bore, or counterbore a plurality of holes or surfaces of different sizes; the number, diameter, and length of the teeth being alternately disposed according to the number of stepped surfaces required—the smallest diameter having the longest ribs or flutes, the next largest diameter having relatively shorter ribs or flutes, and so on.

It is therefore a further object of this invention that the ribs or flutes of the respective diameters should be of the same diameter throughout,—each group alternating with those of different diameter that they may be more readily sharpened or ground, and that the length of each group of teeth of one diameter may be maintained with reference to the cutting end of the teeth of the next alternating diameter—thus life of the tool is greatly increased and too many bearing points are avoided.

With the foregoing and other objects in view which will appear as the description proceeds the invention further resides in the details of construction hereinafter described and claimed, it being understood that changes may be made in the precise embodiment of the invention herein disclosed without departing from the spirit of the same.

In the accompanying drawings forming part of this specification:

Referring now to the letters of reference placed upon the drawings: A denotes the shank of the tool having the usual flattened portion A′ to secure it against turning in a holder (not shown).

B, are relatively long cutting ribs or flutes, alternating with shorter cutting ribs or flutes C, of larger diameter, the distance between the cutting ends *b* of the ribs B, and the cutting ends *c* of the ribs C being such as will admit the necessary length of bore, required in conjunction with the proper depth of counterbore. The outer ends of the radial ribs form the cutting teeth and the ribs of less diameter extend outwardly or longitudinally of the head of the tool beyond the ends of the ribs of greater diameter, and the ribs of smaller diameter constitute pilot teeth and by extending substantially the entire length of the head of the tool, the cutting ends or teeth of the ribs may be maintained in proper relation.

Figure 1:
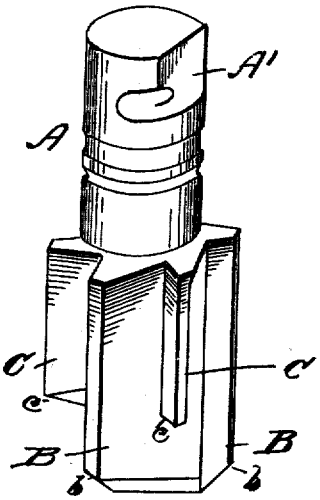
Fig. 1 is a perspective view of a tool which may also be used to counterbore or bore holes of relatively different diameters.
Figure 7:
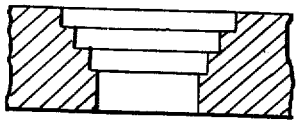
Figs. 7, 8, 9 and 10 are cross-sectional views through pieces of metal showing the character of the work performed by the tool.
Figure 4:
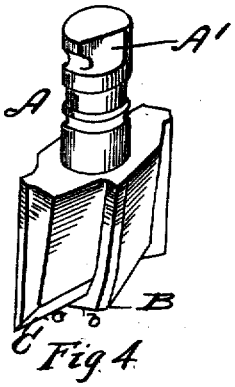
Fig. 4 is a perspective view of the tool as constructed for "spot facing" one or more stepped surfaces.
Figure 8:
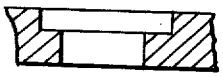
Figure 5:
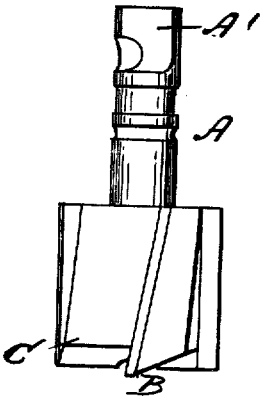
Fig. 5 is a side elevation of the tool shown in the preceding view.
Figure 2:
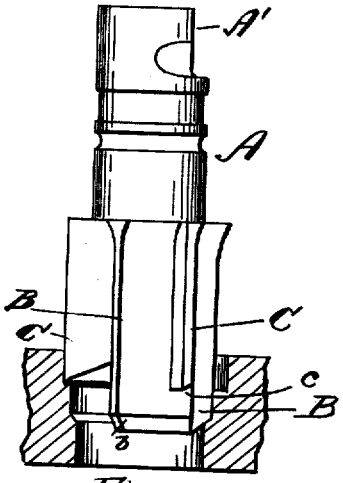
Fig. 2 is a side elevation of the tool as it would appear when making a counterbore.
Figure 9:
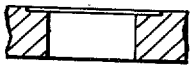

When used for stepped "spot facing" the cutting ends of the respective groups of flutes are more nearly on the same plane, as indicated in Figs. 4 and 5. If it is desired to use the tool shown in Figs. 1 and 2 to bore a hole corresponding with the flutes of enlarged diameter, it will be found that the longer flutes serve as a pilot to guide the relatively shorter flutes in boring the hole of the diameter required.

As indicated in Figs. 7, 8, 9 and 10, the tool may be used to bore a plain hole, or bore single or stepped counterbores, or to bore and "spot face" as may be required. It will also be noted that the tool may be ground and sharpened and the same relative distance between the cutting ends of the respective alternate groups of flutes be maintained.

The independent flutes or ribs with the grooves separating them enables the cutting ribs to be easily ground in originally sharpening them, and also enables each rib to be ground away in resharpening easily and without grinding into the backing of a companion rib. The separate sets of ribs of different diameter enables the ribs to have their periphery permanently prepared by the tool manufacturer. The user simply grinds each rib back from the end in sharpening. The tool can thus be used until the ribs have been ground back the entire length of the head bearing the ribs, or more precisely until the shortest rib has been completely used up. In the ordinary stepped counterbore with the steps in the same blade, the tool can only be ground back the distance between steps. Then it must be either thrown away or entirely made over by grinding new periphery for the ribs.

Figure 6:
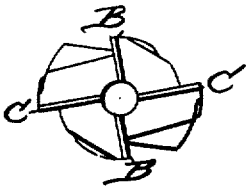
Fig. 6 is an end elevation of the tool shown in Figs. 4 and 5.
Figure 3:
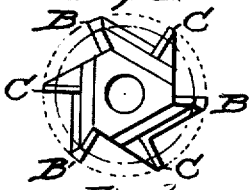
Fig. 3 is an end elevation of the tool.
Figure 10:
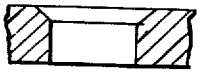

It will thus be seen that I have provided a reaming and facing tool of integral formation and having ribs adapted to ream and shape the walls of a cored hole to simultaneously bore and face one or more steps, the flutes or ribs being in sets of different diameter, of different length and alternately spaced. The body of the tool comprises a head from which the ribs radially extend, the head extending substantially the length of the longest ribs, and other sets of greater diameter extending forward from the rear end of the body a less distance as their diameter increases, whereby the longest set of ribs perform a reaming or facing operation, or both, and the shorter set or sets of ribs perform shaping or reaming operations, or both. In other words, the head of the tool is substantially the diameter of the shank and extends down through the ribs or cutters to make a very solid tool, wherein the cutting ribs are carried wholly along the outside of the head or on the extreme end thereof. For instance, in Fig. 6 the cutting edges of the largest ribs extend a slight distance beyond the bottom of the head, in order to face the bottom of the cored hole. This, I consider, within the terms "running substantially to the outer end of the head" as used in some of the claims.

By the term "shaping" in the claims I mean, shaping in counterboring, countersinking or facing.

Having thus described my invention, what I claim is:

1. A tool of the character described, comprising a head, and a plurality of integral radial ribs, the outer ends of which form cutting teeth, said ribs being alternately spaced and different in length and diameter and the ribs of less diameter constituting pilot teeth and projecting beyond the ends of the ribs of greater diameter and extending substantially the entire length of the head, whereby the proper relation between the cutting ends of the ribs may be maintained at all times.

2. A tool of the character described, comprising a head, and a plurality of integral spaced radial ribs of alternately different length and diameter, the outer ends of the ribs constituting cutting teeth and the cutting teeth of each group of ribs of the same length and diameter being spaced from and on a different plane from the cutting teeth of the group of ribs of relatively different length and diameter, the ribs of less diameter being extended beyond the ends of the ribs of greater diameter and also extending substantially the length of the head.

3. A boring tool of the character described, comprising a head, and a plurality of integrally spaced radial ribs of alternately different length and diameter, the outer ends of the ribs constituting cutting teeth and the cutting teeth of each group of ribs of the same length and diameter being spaced from and on a different plane from the cutting teeth of the group of ribs of relatively different length and diameter, the ribs of less diameter being extended outwardly beyond the cutting ends of the ribs of greater diameter and also extending inwardly along the head in parallelism and overlapping relation of the said ribs of greater diameter, whereby the proper relation between the cutting ends of the ribs may be maintained until at least one group of the ribs is worn away.

4. A tool for cutting in an already existent hole, comprising a shank terminating in a head, integral cutting ribs projecting from the sides of the head and running along the sides of the head in separate distinctly spaced ribs in sets of different radii but in overlapping relation, the sets of smaller radii running substantially to the outer end of the head and running beyond those of larger radii at the working end of the tool and numbering at least three to pilot the cutting ribs of larger radii.

5. A tool for the purpose described, comprising a shank terminating in a head, integral cutting ribs carried by the head, the said ribs being in sets of different radii the sets running in overlapped relation along a portion of the length of the tool, those ribs of smallest radii running substantially to the outer end of the head and running beyond those of larger radii at the working end of the tool and being chamfered to lead into the work, the ribs of larger radii being arranged and shaped to act as end shaping cutters.

6. A tool for the purpose described, comprising a shank terminating in a head, integral cutting ribs carried by the head, the said ribs arranged in sets of different radii the sets running in overlapped relation along a portion of the length of the tool, those ribs of smallest radii running substantially to the outer end of the head and beyond those of larger radii at the working end of the tool and being chamfered to lead into the work and ribs of larger radii being arranged to act as end shaping cutters, the ribs of smaller radii numbering at least three to pilot the cutting ribs of larger radii.

7. A tool for the purpose described, comprising a shank terminating in a head, integral cutting ribs projecting from the sides of the head and running along a portion of the length of the tool in sets of different radii but in overlapping relation, the sets of smallest radii extending substantially to the outer end of the head and beyond those of larger radii at the working end of the tool, at least one set having cutting portions shaped to cut a step substantially at right angles to the axis of the hole.

8. A tool for the purpose described, comprising a shank terminating in a head, integral cutting ribs projecting from the sides of the head and running along a portion of the length of the tool in sets of different radii but in overlapping relation, the sets of smallest radii extending substantially to the outer end of the head and beyond those of larger radii at the working end of the tool and having inclined cutting portions to lead into the work and ribs of larger radii being formed to act as end shapers for shaping a surface to be substantially right angular to the axis of the tool, the ribs of smaller radii serving to pilot the ribs of larger radii.

9. A tool for the purpose described, comprising a relatively heavy shank having a continuation forming a cutter-carrying head which is relatively short and sturdy in construction, and a plurality of integral cutters relatively short as compared with their radii and projecting from the sides of the cutting head, said cutters arranged in sets of different radii, those cutters of smaller radii extending substantially to the working end of the head and beyond the cutters of larger radii at the working end of the tool, the cutting ribs extending in overlapping relation along the sides of the head and in substantial parallelism and also having at most only a limited departure from the condition of parallelism with the axis of the tool, whereby the comparatively short cutters do not extend a larger portion of the distance around the tool in passing from one end of a cutter to the other.

In testimony whereof I have hereto affixed my signature.

JOHN HUGO SMITH.

DISCLAIMER

Re. No. 16,817.—*John Hugo Smith*, Detroit, Mich. REAMING AND COUNTERBORING TOOL. Reissue patent dated December 13, 1927. Disclaimer filed January 18, 1932, by the assignee, *Eclipse Interchangeable Counterbore Company*.

Hereby disclaims claims 1, 2, 3, 5, 7, 8 and 9 of said patent.

[*Official Gazette February 9, 1932.*]